United States Patent [19]
Zicker et al.

[11] Patent Number: 5,703,934
[45] Date of Patent: Dec. 30, 1997

[54] CORDLESS TELEPHONE WITH INTEGRAL CALLER ID DISPLAY

[75] Inventors: Robert G. Zicker; John K. Dion, both of Roswell, Ga.

[73] Assignee: GTE Mobile Communication Service, Atlanta, Ga.

[21] Appl. No.: 458,537

[22] Filed: Jun. 2, 1995

Related U.S. Application Data

[63] Continuation-in-part of Ser. No. 263,711, Jun. 22, 1994, which is a continuation-in-part of Ser. No. 201,455, Feb. 24, 1994.

[51] Int. Cl.[6] .............. H04M 11/00; H04M 1/56; H04Q 7/00
[52] U.S. Cl. .............. 379/61; 455/33.1; 379/142
[58] Field of Search .............. 379/58, 59, 61, 379/63, 142; 455/33.1

[56] References Cited

U.S. PATENT DOCUMENTS

| | | | |
|---|---|---|---|
| 4,989,230 | 1/1991 | Gillig et al. | 379/59 |
| 5,043,736 | 8/1991 | Darnell et al. | 342/357 |
| 5,070,521 | 12/1991 | Warner et al. | 379/58 |
| 5,155,759 | 10/1992 | Saegusa et al. | 379/61 |
| 5,274,699 | 12/1993 | Ranz | 379/142 |
| 5,363,429 | 11/1994 | Fujisawa | 379/59 |
| 5,371,781 | 12/1994 | Ardon | 379/59 |

OTHER PUBLICATIONS

"Mobile Station–Land Station Compatibility Specification" EIA/TIA 553 by The Electronic Industries Association Sep. 1989.

*Primary Examiner*—Dwayne Bost
*Assistant Examiner*—Scott Richardson
*Attorney, Agent, or Firm*—Leonard C. Suchyta

[57] ABSTRACT

A radiotelephone (RT) operates in either a cellular telephone mode or a cordless telephone mode within a cellular telecommunications system. The RT operates in the cordless mode if it is within the operating range of a cordless base station. The cordless base station receives data from a central telephone office, converts the data into a transmittable caller ID message, and transmits the caller ID message to the RT. The RT receives the caller ID message and displays it in a readable form to the user. The caller ID message may be saved at the RT for subsequent retrieval by the user. In addition, a speed dial operation may be performed to respond to the caller ID message.

4 Claims, 4 Drawing Sheets

CORDLESS TELEPHONE WITH INTEGRAL CALLER ID DISPLAY

RELATED APPLICATIONS

This application is a Continuation-In-Part of "Multiple Mode Personal Wireless Communications System," by Robert G. Zicker et al., Ser. No. 08/263,711, filed Jun. 22, 1994, which is a Continuation-In-Part of "Multiple Mode Personal Wireless Communications System," by Robert G. Zicker et al., Ser. No. 08/201,455, filed Feb. 24, 1994.

TECHNICAL FIELD OF THE INVENTION

The present invention relates generally to radiotelephone communications systems. In particular, the present invention relates to a radiotelephone capable of displaying a message that identifies the party making an incoming call.

BACKGROUND OF THE INVENTION

Caller ID is a well-known feature that allows a telephone user to identify the party making an incoming call before he or she answers the call. When a telephone call is directed to a customer who has caller ID service, the central telephone office transmits a caller ID message concurrently with the incoming call. Upon reception of the telephone call, the caller ID message is displayed to the dialed party. The dialed party may utilize the caller ID message to screen his or her incoming phone calls, keep a journal of incoming calls, monitor for prank calls, or serve any personal or business needs.

To enjoy the benefits of conventional caller ID service, a person typically rents or purchases a special component that receives and displays the caller ID messages. This component may, for example, be a separate box that must be connected in line with a standard telephone unit. This configuration can be messy and particularly troublesome if the separate caller ID box is not located near to the telephone itself. Alternatively, a user may rent or purchase a modified deskphone that includes a display element and performs the functions required to support caller ID service. However, such deskphone units are typically large, heavy, and immobile for all practical purposes.

Cordless telephones may incorporate the caller ID feature by utilizing the special caller ID box in conjunction with the cordless base station. While this configuration allows greater user mobility with respect to the cordless telephone itself, the caller ID display and control unit usually remains somewhat stationary once it is installed in a convenient location. In other words, merely connecting the caller ID unit to a cordless phone does not make the caller ID feature mobile as well.

SUMMARY OF THE INVENTION

Accordingly, it is an advantage of the present invention that a method for displaying a caller ID message at a radiotelephone (RT) is provided.

Another advantage is that an RT set is provided that does not require separate components dedicated to receiving or displaying the caller ID message.

A further advantage of the present invention is that it provides an RT with an integrated display for displaying the caller ID message.

Another advantage is that the present invention provides a cordless base station that receives caller ID information from a central telephone office, converts the caller ID information into a transmittable caller ID message, and transmits the caller ID message for display at an RT.

The above and other advantages of the present invention are carried out in one form by a method for displaying information describing an incoming call at an RT. The method involves establishing a communication channel for communication between the RT and a remote transceiving location, receiving signaling data over the communication channel, receiving a caller ID message over the communication channel, and displaying the caller ID message in a readable form at the RT. The signaling data and the caller ID message are formatted according to the same cellular transmission protocols before being transmitted from a remote transceiving location configured to communicate with the RT.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
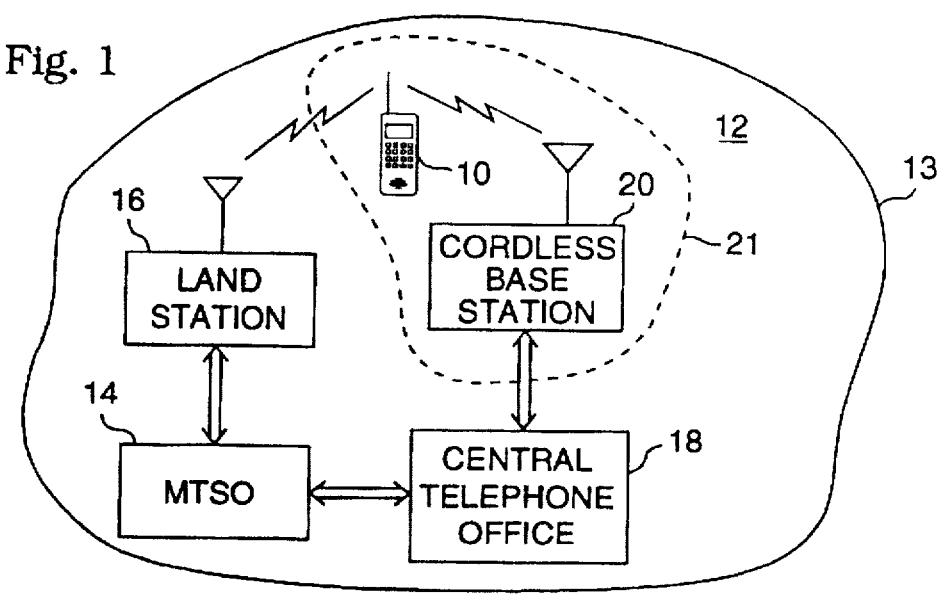
FIG. 1 is a schematic diagram of the operational environment for a radiotelephone (RT) capable of displaying a caller ID message.

Referring to FIG. 1, the basic operational environment for a radiotelephone (RT) 10 according to the present invention is illustrated. Preferably, RT 10 is configured to function in both a cellular telephone mode and a cordless telephone mode. Depending upon the location of RT 10 within a conventional cellular telecommunications system (CTS) 12, RT 10 functions in one of the two operational modes. However, nothing prevents the present invention from being implemented as a single mode device functioning as either a conventional cellular telephone or a conventional cordless telephone.

CTS 12 generally includes a mobile telephone switching office (MTSO) 14 and a land station 16 configured to communicate with RT 10 when RT 10 is functioning in the cellular telephone mode. MTSO 14 provides a communication link between a conventional central telephone office 18 and land station 16, which is a remote transceiving location. Although only one MTSO 14 and one land station 16 are shown in FIG. 1, those skilled in the art will recognize that CTS 12 may include any number of MTSOs and land stations depending upon the specific size of CTS 12. Although the current description focuses on RT 10 operating within a single CTS 12, nothing prevents RT 10 from operating in more than one system, i.e., roaming. As such, the processes described below may also be implemented along with conventional intersystem processes.

According to the preferred embodiment of the present invention, RT 10 is also configured to interact with a cordless base station 20. Cordless base station 20 also functions as a remote transceiving location. In accordance with the preferred embodiment, cordless base station 20 may support more than one RT 10 to provide a user with a plurality of cooperating cordless extensions. Cordless base station 20 is also in data communication with central telephone office 18. Physically, cordless base station 20 is located within a cellular operating boundary 13 of CTS 12 to allow RT 10 to function as a dual-mode device. When RT 10 is operating within the transmit/receive range of cordless base station 20, represented by a cordless operating boundary 21, it functions in the cordless telephone mode. In contrast, when RT 10 is outside of cordless operating boundary 21, it functions in the cellular telephone mode.

The present invention accomplishes the dual-mode operation by assigning a cellular telephone number (represented by a mobile identification number, or MIN) to RT 10. When RT 10 is functioning in the cellular telephone mode, incoming calls are associated with the cellular MIN. However, when RT 10 is functioning in the cordless telephone mode, MTSO 14 forwards incoming calls from the cellular MIN to a cordless telephone number. The cordless telephone number is utilized by CTS 12 internally, i.e., the calling party need not be aware of the cordless telephone number. Consequently, the forwarded calls are routed to cordless base station 20 via central telephone office 18.

The preferred embodiment utilizes the same cellular transmit/receive protocols for both the cellular telephone mode and the cordless telephone mode. For purposes of the present invention, transmit/receive protocols include operating frequency assignments, data encoding and decoding processes, signal message formatting, and other associated processes, methods, and procedures. The present invention also utilizes these same transmit/receive protocols for providing conventional signaling data and the caller ID messages to RT 10. Signaling data may include control orders, alert messages, identification signals, supervisory signals, and other operating data. According to one transmit protocol, the signaling data and the caller ID message are transmitted as digitally encoded messages having a substantially fixed bit transmission rate. Preferably, the bit transmission rate is 10 kilobits/second, which is a standard rate utilized in the cellular telephony field. The use of 10 kilobits/second encoding reduces the amount of modifications required to implement the present invention, because existing cellular systems and telephones are required to process such messages. As such, no additional components in RT 10 are necessary to display the caller ID messages.

According to the preferred embodiment, when RT 10 is operating in the cordless telephone mode, central telephone office 18 directs incoming calls, through which description data are conveyed, to cordless base station 20. For purposes of the present invention, description data include encoded information associated with the incoming call. Such information may identify the calling party's name, location, or telephone number, and/or the time and date of the incoming call. The description data are converted into a transmittable caller ID message that is formatted according to the cellular transmission protocols. Following this conversion at base station 20, the caller ID message is transmitted by cordless base station 20 for display at RT 10. Cordless base station 20 is also configured to perform various processes described below. As stated above, RT 10 is not limited to operating as a dual-mode device, and the present invention may also be configured as a standard cordless telephone. In yet another embodiment, RT 10 may be configured as a conventional cellular telephone. In such an embodiment, the description data are received at MTSO 14, converted into the caller ID message for transmittal by land station 16, and subsequently received at RT 10.

Figure 2:
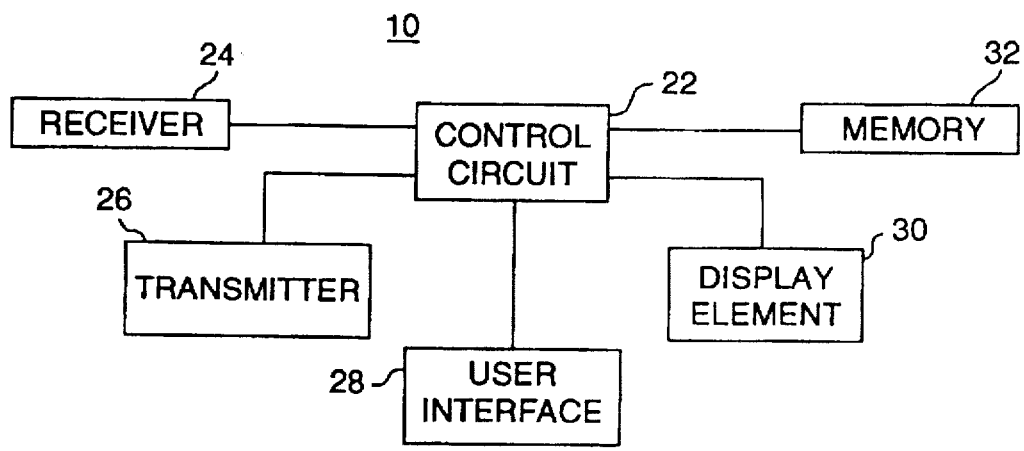
FIG. 2 is a block diagram of an RT according to the present invention.

With reference now to FIG. 2, RT 10 is shown in block diagram form. For clarity, standard operating elements well known to those skilled in the art and unimportant to the present invention are not shown in FIG. 2 or described in detail herein.

In general, RT 10 is configured around a control circuit 22, which controls the operation of RT 10. Various components are connected to or are in data communication with control circuit 22, including a receiver 24, a transmitter 26, a user interface 28, a display element 30, and a memory 32. Control circuit 22 may, for example, be a conventional microprocessor circuit well known in the cellular telephony art.

Receiver 24, which is connected to control circuit 22, is configured to receive the signaling data and the caller ID message over a particular communication channel. Those skilled in the art will appreciate that the particular communication channel over which RT 10 communicates may vary depending upon conditions such as the location of RT 10 within CTS 12. As such, the present invention is not limited to communication over only one specific communication channel. However, a particular communication channel is utilized for both signaling purposes and for caller ID purposes after it is established as the communication channel for current operating conditions. As described above, the signaling data and the caller ID message are formatted according to the same cellular transmission protocols.

RT 10 also includes transmitter 26, which is connected to control circuit 22. Transmitter 26 is configured to transmit the signaling data associated with conventional cellular telephone operations and processes. In addition, transmitter 26 transmits other signals utilized in processes described below. If desired, transmitter 26 and receiver 24 may be integrated into one transceiver assembly.

User interface 28 is also connected to control circuit 22. According to the preferred embodiment, user interface 28 includes keypad pushbuttons that are utilized to control standard cellular telephone functions along with the various functions described below.

Display element 30 is connected to and controlled by control circuit 22. Display element 30 is preferably a conventional cellular telephone display panel that includes display features well known in the art. In addition, display element 30 functions to display the caller ID message in a readable format at RT 10. Display element 30 may also be utilized to display information for user feedback while the user operates RT 10.

Control circuit 22 is also connected to memory 32, which stores, along with other data, programming instructions that define the various processes described below. Memory 32 is also capable of storing a number of received caller ID messages for future retrieval. In addition, memory 32 may store various cellular operating parameters well known to those skilled in the art.

Figure 3:
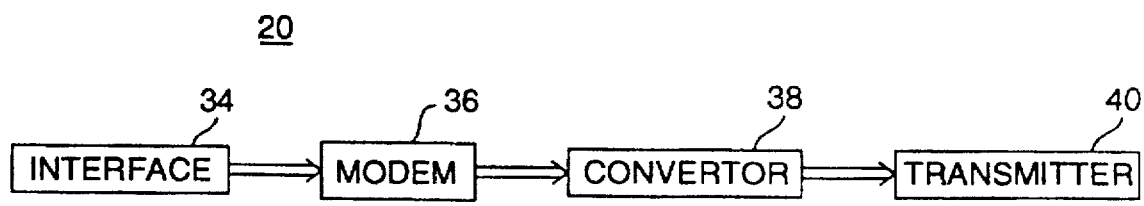
FIG. 3 is a block diagram of a cordless base station according to the present invention.

With reference now to FIG. 3, cordless base station 20 is shown in block diagram form. As described above, cordless base station 20 allows RT 10 to function in the cordless telephone mode if RT 10 is within the cordless operating boundary 21. For clarity, standard operating elements well known to those skilled in the art and unimportant to the present invention are not shown in FIG. 3 or described in detail herein.

Cordless base station 20 includes an interface 34 for establishing data communication between cordless base station 20 and central telephone office 18 (see FIG. 1). Interface 34 may be a conventional telephone jack or other connector well known in the art. Interface 34 is preferably in communication with a modem 36, which extracts description data from the incoming call. According to the preferred embodiment, modem 36 is compatible with data formatted for conventional telephone modem signal processing.

Cordless base station 20 also includes a convertor 38 configured to convert the extracted description data into the transmittable caller ID message. Convertor 38 may be implemented using a conventional microprocessor programmed to perform a process described below. As described above, the caller ID message is converted and formatted to be compatible with the cellular transmission protocol. Cordless base station 20 includes a transmitter 40 configured to transmit the formatted caller ID message to RT 10. Transmitter 40 is preferably the same component used to transmit the incoming call and other signaling data (described above) to RT 10. Of course, cordless base station 20 also includes a receiver (not shown), which may be combined with transmitter 40 into an integral transceiver assembly.

RT 10 and cordless base station 20 form a radiotelephone set that preferably is utilized in conjunction with CTS 12 to provide a user with a dual-mode (cellular and cordless) communication device. RT 10 displays the caller ID message for convenient viewing by the user. As mentioned above, nothing prevents RT 10 from being configured as a single-mode cellular telephone or a single-mode cordless telephone, and the following processes may be implemented according to the desired configuration.

Figure 4:
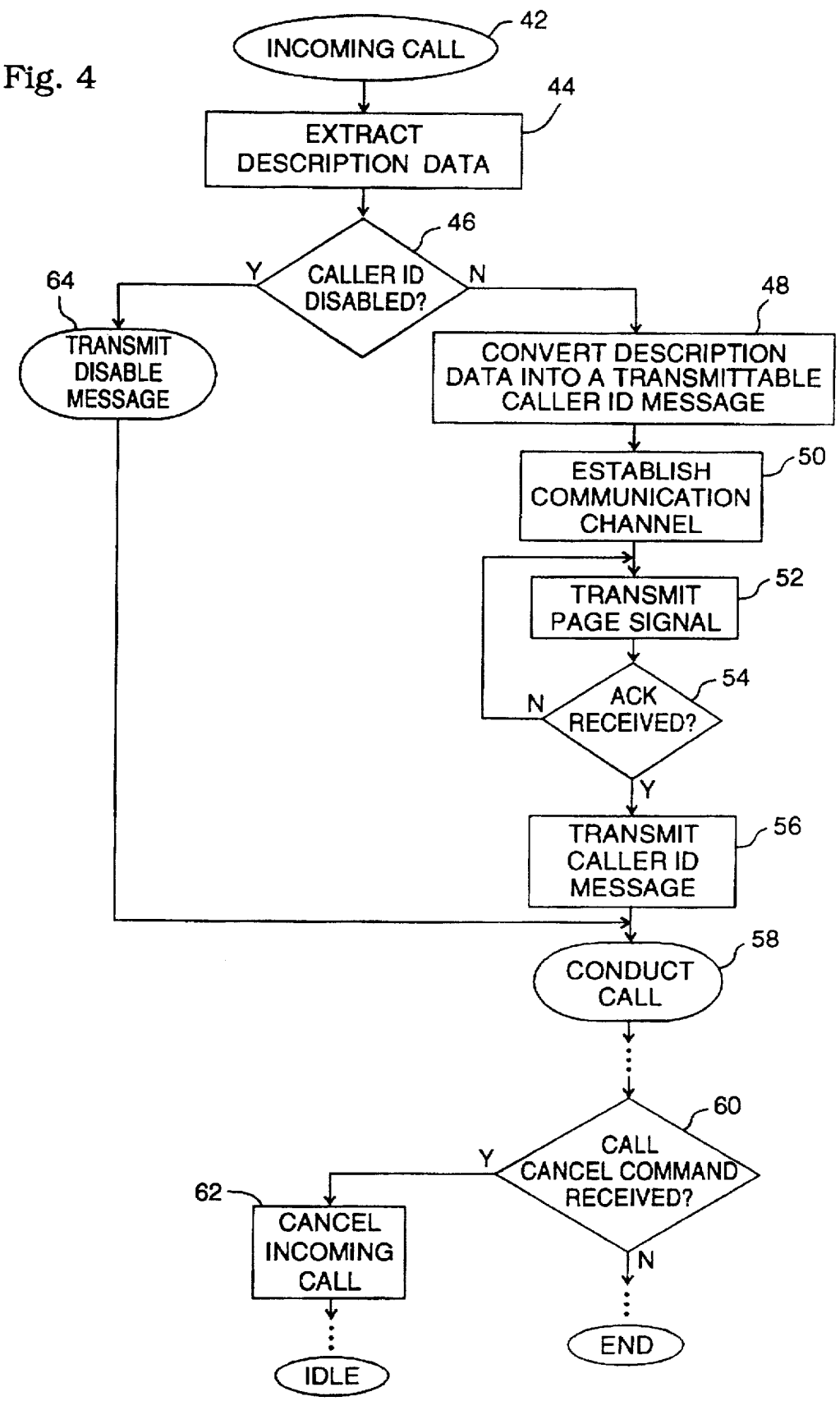
FIG. 4 is a flow diagram of an Incoming Call process performed by the cordless base station.

With reference to FIG. 4, an Incoming Call process 42 performed at cordless base station 20 is depicted as a flow diagram. Process 42 is preferably initiated while RT 10 is in an idle state, i.e., RT 10 is powered up and not busy with another telephone call. Process 42 is performed upon reception of an incoming call conveying description data at cordless base station 20.

Incoming Call process 42 begins with a task 44, which extracts the description data from the incoming call. As described above, the description data are encoded representations of information related to the incoming call, e.g., the calling party's name, location, and/or telephone number. According to the preferred embodiment, the description data may instead be a disable indicator that informs cordless base station 20 that the caller ID feature has been blocked or disabled. Preferably, modem 36 (see FIG. 3) is used in performing task 44.

Following task 44, a query task 46 is performed to determine whether the caller ID feature has been disabled by the calling party or possibly by the system operator. For example, query task 46 may test whether the description data contains a disable indicator. If query task 46 detects that the caller ID feature has been disabled, then a procedure 64 is performed (described below). If query task 46 determines that the caller ID feature has not been disabled, then a task 48 begins. Task 48 causes convertor 38 (see FIG. 3) to convert the description data into a transmittable caller ID message. The caller ID message is preferably formatted according to the cellular transmission protocol also utilized for conventional signaling purposes.

After task 48, a task 50 establishes a communication channel for communication between cordless base station 20 and RT 10. Those skilled in the art are familiar with different procedures for establishing a cellular communication channel between a transmitter and a receiver. As stated above, the particular communication channel may be dependent upon the location of RT 10, or it may be fixed for a particular radiotelephone set. Of course, task 50 may be performed at any time prior to the transmission of the caller ID message, and the present invention is not limited to performing the specific tasks in the described order.

Following task 50, a task 52 is performed to cause transmitter 40 (see FIG. 3) to transmit a page signal over the established communication channel from cordless base station 20 to RT 10. The page signal is transmitted to locate RT 10 when an incoming call is directed to it. Assuming that RT 10 receives the page signal, it transmits an acknowledge (ACK) signal to cordless base station 20. ACK signals are well known in the cellular telephony art, and are used to inform a transmitting unit that a signal was correctly received at a receiving unit. As such, a query task 54 follows task 52 to determine whether cordless base station 20 received the ACK signal from RT 10. If query task 54 finds that the ACK signal has not been received at cordless base station 20, then task 52 is reentered to retransmit the page signal. Of course, an error detection or timing task (not shown) may be included to ensure that cordless base station 20 does not unnecessarily repeat task 52 and query task 54.

If query task 54 determines that the ACK signal was received at cordless base station 20, then a task 56 is prompted. Task 56 causes transmitter 40 to transmit the caller ID message for display at RT 10. Following, or at about the same time as, task 56, a procedure 58 is performed to conduct the incoming call in a conventional manner. Procedure 58 involves conventional cellular telephony processes such as ring alerting and voice channel allocation.

After task 56 and procedure 58 are performed, a query task 60 is initiated. Query task 60 tests whether a call cancel command was received at cordless base station 20. According to one aspect of the preferred embodiment, the user may choose to cancel an incoming call without answering it. If query task 60 does not detect a call cancel command, then Incoming Call process 42 ends. If query task 60 finds that a call cancel command was received, then a task 62 cancels the incoming call by, for example, performing a hook-flash. Following task 62, cordless base station 20 enters an idle mode to monitor for another incoming call.

As stated above, if query task 46 determines that the caller ID feature has been disabled, then procedure 64 is performed. Procedure 64 causes base station 20 to transmit a disable message rather than a caller ID message. According to the preferred embodiment, procedure 64 involves the same process tasks described above for the transmission of a caller ID message. However, during procedure 64, the description data is a disable indicator that is converted into a transmittable disable message. For example, the disable message may be a simple encoded message that is recognizable by RT 10 upon reception. Alternatively, the disable message may be a simple text message displayable at RT 10. The disable message is processed by cordless base station 20 in the same manner as a caller ID message.

Following, or at about the same time as, procedure 64, procedure 58 is performed to conduct the incoming call with RT 10. Thus, even if the caller ID feature is disabled, cordless base station 20 processes the remainder of the incoming call in a conventional manner. Following procedure 58, Incoming Call process 42 proceeds as described above in connection with a transmitted caller ID message.

Figure 5:
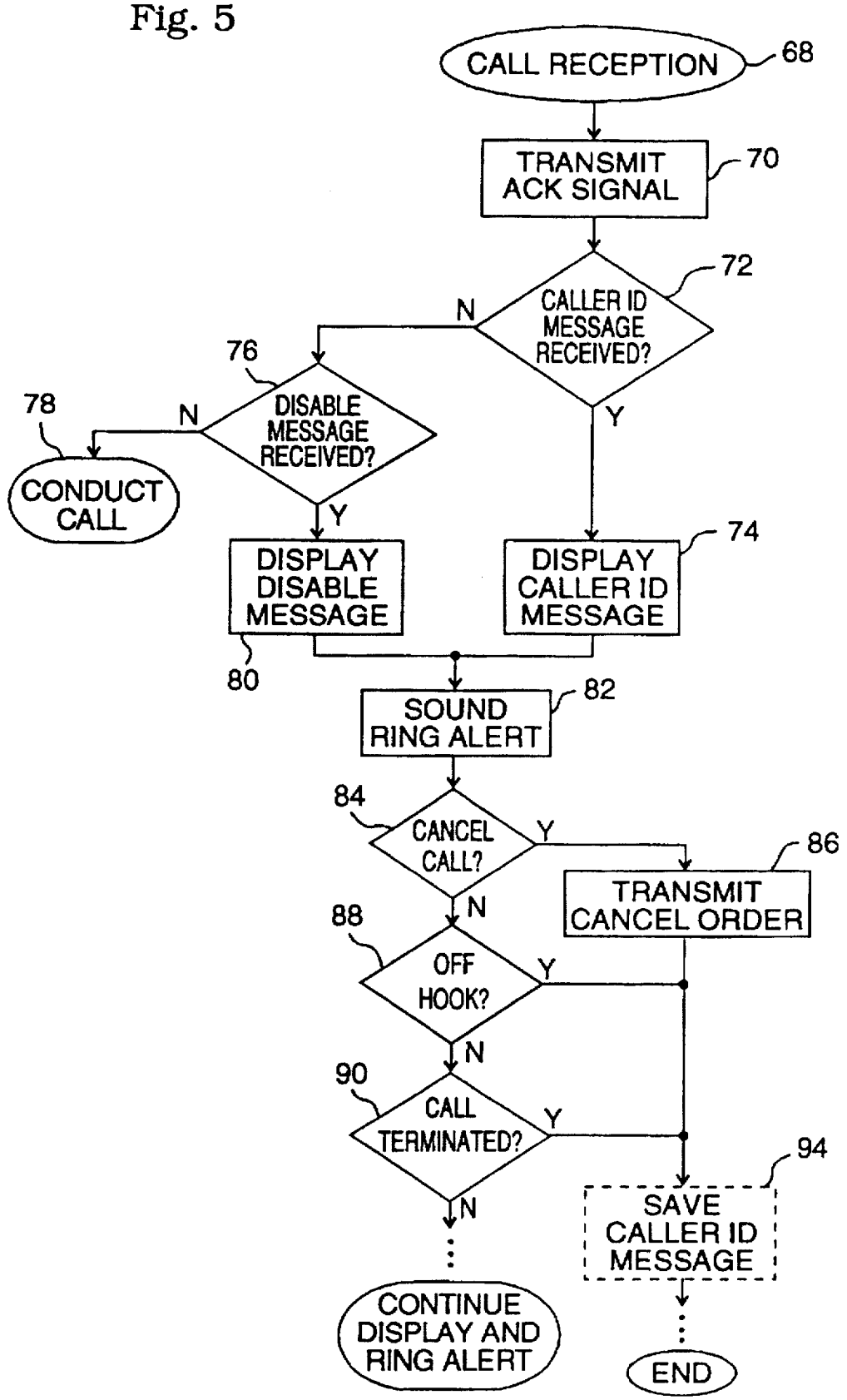
FIG. 5 is a flow diagram of a Call Reception process performed by the RT.

With reference to FIG. 5, a Call Reception process 68 performed by RT 10 is illustrated. Process 68 is performed upon the reception of a page signal transmitted from cordless base station 20 (see description of task 52 above). Process 68 begins with a task 70, which causes RT 10 to reply to the page signal by transmitting an ACK signal to cordless base station 20 (see description of query task 54 above). Assuming that cordless base station 20 receives the ACK signal, a query task 72 is prompted.

Query task 72 determines whether a caller ID message was received by receiver 24 (see FIG. 2). If query task 72 determines that a caller ID message was received, then task 74 displays the caller ID message at display element 30 (see FIG. 2). As described previously, the caller ID message may include the calling party's telephone number, name, or location, and possibly the time or date of the incoming call. Following, or concurrently with, task 74, a task 82 initiates a ring alert at RT 10. If query task 72 determines that a caller ID message was not received, then a query task 76 is initiated.

Query task 76 tests whether receiver 24 received a disable message instead of a caller ID message. If query task determines that a disable message was not received, then a procedure 78 begins. Procedure 78 causes RT 10 to process the incoming call in a conventional manner without displaying either a caller ID message or a disable message. If query task 76 determines that a disable message was received at RT 10, then a task 80 is initiated. Task 80 displays the disable message at display element 30. The disable message preferably indicates to the user that the caller ID feature is not active for the incoming call. For example, the disable message may read: "BLOCKED," "DISABLED," "INACTIVE," or the like. Following task 80, or concurrently with task 80, task 82 begins to sound the ring alert at RT 10 to notify the user.

Following task 82, regardless of whether a caller ID message or a disable message is displayed at RT 10, a query task 84 is initiated. Query task 84 tests whether the user desires to cancel the incoming call without answering it. Query task 84 may, for example, monitor RT 10 for a user input at user interface 28 (see FIG. 2). If query task 84 determines that the call is to be canceled, then a task 86 transmits a cancel order to cordless base station 20. As described above, the cancel order may cause a hook-flash to be performed to terminate the incoming call. Upon termination of the incoming call, the ring alert sound will also be terminated. Following task 86, an optional task 94 may be performed (described below).

If query task 84 fails to determine that the incoming call is to be canceled, then a query task 88 is prompted. Query task 88 tests whether the user answers the incoming call, i.e., the user places RT 10 off hook. If query task 88 finds that RT 10 is placed off hook, then optional task 94 may be performed (described below). If query task 88 determines that RT 10 is not placed off hook, then a query task 90 begins. Query task 90 tests whether the incoming call has been terminated by the calling party or possibly by the operating system. If query task 90 determines that the call has been terminated, then optional task 94 may be performed (described below). If query task 90 determines that the incoming call has not been terminated, then Call Reception process 68 continues to display either the caller ID message or the disable message, and reenters at task 82 (not shown). Process 68 may include error detection or timing tasks (not shown) to ensure that RT 10 does not erroneously continue to display a message and sound the ring alert.

Optional task 94 may be performed after task 86 if the incoming call has been canceled, after query task 88 if RT 10 has been placed off hook, or after query task 90 if the incoming call has been terminated. Task 94 causes RT 10 to save the current caller ID message in memory 32 (see FIG. 2). Task 94 may be responsive to a user input or performed automatically by RT 10. Of course, if the caller ID feature has been disabled, then task 94 need not be performed. According to the preferred embodiment, several caller ID messages may be stored in memory 30 for future retrieval. After task 94, Call Reception process 68 ends. If the user has answered the incoming call (query task 88), then process 68 exits by conducting the call in a conventional manner. However, if the incoming call has been cancelled (query task 84) or terminated (query task 90), then process 68 exits into an idle mode.

Figure 6:
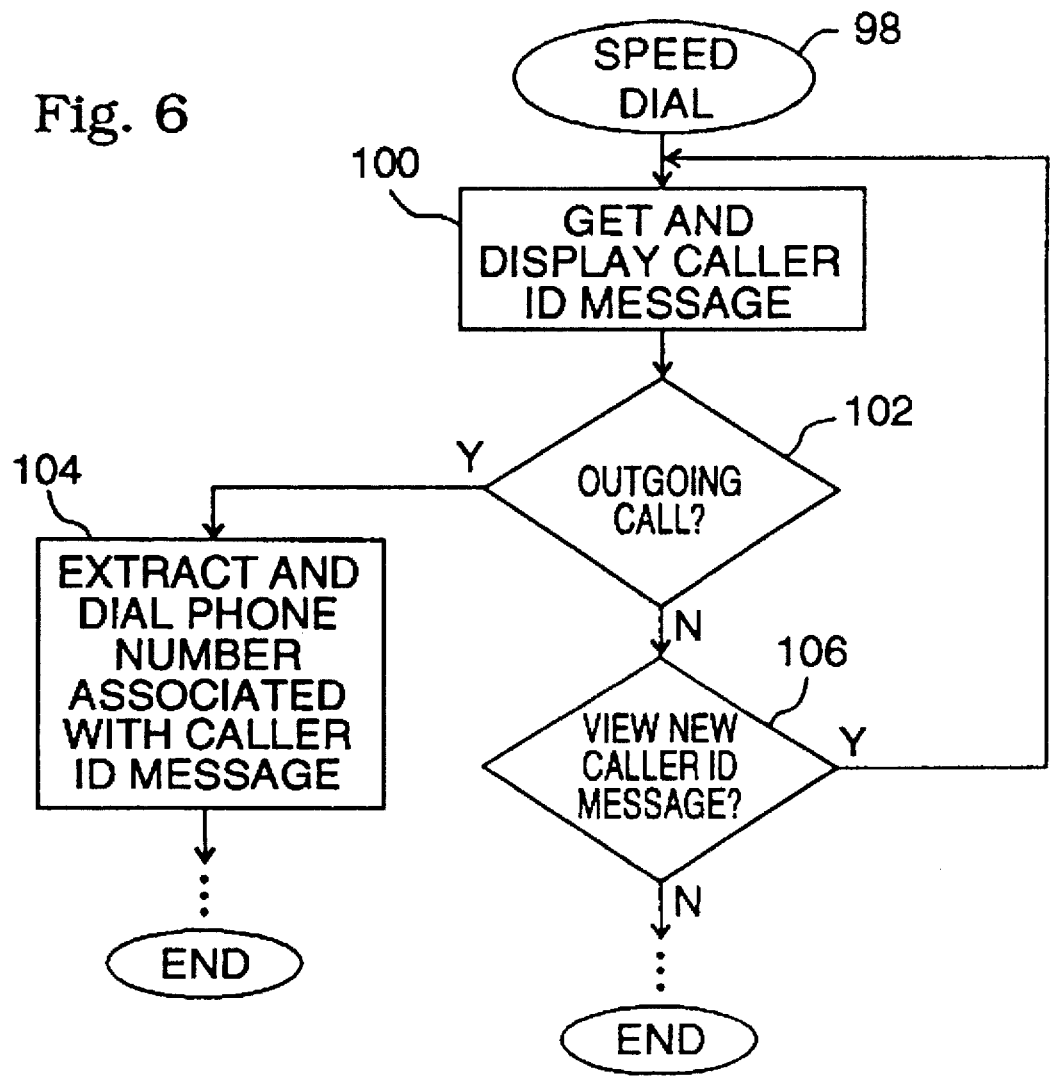
FIG. 6 is a flow diagram of a Speed Dial process performed by the RT.

FIG. 6 depicts a Speed Dial process 98 performed by RT 10 to quickly dial a displayed number. Nothing prevents RT 10 from performing conventional speed dial and redial procedures in addition to process 98. Process 98 is preferably performed when RT 10 is in an idle mode. Process 98 begins with a task 100, which gets and displays a caller ID message at display element 30 (see FIG. 2). If process 98 is initiated while a caller ID message is currently displayed, then task 100 may be bypassed (not shown). Otherwise, task 100 retrieves a caller ID message from memory 32. The saving of caller ID messages was described above in relation to Call Reception process 68 (see FIG. 5). After task 100 displays a caller ID message, a query task 102 is initiated.

Query task 102 determines whether to call the telephone number displayed with the caller ID message. Query task 102 may be responsive to a user input at user interface 28, such as the pressing of an "OFF-HOOK" key. If query task 102 determines that the user desires to have the displayed telephone number sent, then a task 104 is prompted. Task 104 causes RT 10 to extract the telephone number associated with and possibly displayed with the caller ID message before sending. Thus, Speed Dial process 98 may be performed to reply to a previously missed or ignored call. Following task 104, process 98 ends and conventional cellular processes related to conducting calls may be performed. However, if query task 102 determines that the user did not choose to call the displayed telephone number, then a query task 106 is initiated.

Query task 106 tests whether the user would like to view a different caller ID message. For example, the user may wish to scroll through the caller ID messages stored in memory 32 until he or she decides to return a particular call. If query task 106 determines that a new caller ID message is not desired, then Speed Dial process 98 ends. If query task 106 finds that the user wishes to retrieve a new caller ID message, then task 100 is reentered to get and display the next caller ID message. Thus, process 98 may be repeated for each caller ID message stored in memory 30.

In summary, the present invention provides a method for displaying a caller ID message at an RT that does not require separate components to receive or display the caller ID message. The RT displays the caller ID message in a readable format at an integrated display element. The preferred embodiment provides an RT set that includes a cordless base station that receives caller ID information from a central telephone office, converts the caller ID information into a transmittable caller ID message, and transmits the caller ID message for display at the RT.

The above description is of a preferred embodiment of the present invention, and the invention is not limited to the specific embodiment described and illustrated. For example, several process tasks need not be performed in the precise order described to achieve equivalent results. In addition, the processes and apparatus described herein may be implemented along with conventional cellular telephony processes and apparatus for compatibility with existing systems. Furthermore, many variations and modifications will be evident to those skilled in this art, and such variations and modifications are intended to be included within the spirit and scope of the invention, as expressed in the following claims.

What is claimed is:

1. A radiotelephone (RT) set capable of providing information describing an incoming call to a user, said RT set comprising:
    a cordless base station capable of receiving an incoming call conveying description data from a central telephone office, said cordless base station having:
        an interface for establishing data communication between said cordless base station and said central telephone office,
        a convertor configured to convert said description data into a transmittable caller identification (caller ID) message, said caller ID message being formatted according to a cellular transmission protocol, and
        a transmitter configured to transmit said caller ID message to said RT; and
    an RT configured to communicate with said cordless base station, said RT having:
        a control circuit configured to control the operation of said RT,
        a receiver connected to said control circuit and configured to receive said caller ID messages,
        a display element connected to said control circuit and configured to display said caller ID message in a readable format, and
        a user interface connected to said control circuit and configured to allow a user to control the operation of said RT.

2. An RT set according to claim 1, wherein said cordless base station further comprises a modem for extracting said description data from said incoming call.

3. An RT set according to claim 1, wherein:
    said cordless base station has a transmit/receive range defined by a cordless boundary;
    said RT is configured to function in a cordless telephone mode by communicating with said cordless base station if said RT is within said cordless boundary; and
    said RT is configured to function in a cellular telephone mode if said RT is outside of said cordless boundary.

4. An RT set according to claim 1, wherein said convertor converts said description data into a digitally encoded message having a substantially fixed bit transmission rate.

* * * * *